(12) United States Patent
Yan et al.

(10) Patent No.: US 11,574,069 B2
(45) Date of Patent: Feb. 7, 2023

(54) UTILIZING NEURAL NETWORKS FOR DATA ANONYMIZATION

(71) Applicant: VISIER SOLUTIONS INC., Vancouver (CA)

(72) Inventors: David Yan, Portola Valley, CA (US); Victor Kuznetsov, Santa Clara, CA (US); Anton Kirillov, Moscow (RU); Viacheslav Seledkin, Moscow (RU)

(73) Assignee: Visier Solutions Inc., Vancouver (CA)

( * ) Notice: Subject to any disclaimer, the term of this patent is extended or adjusted under 35 U.S.C. 154(b) by 269 days.

(21) Appl. No.: 16/902,937

(22) Filed: Jun. 16, 2020

(65) Prior Publication Data

US 2020/0401716 A1 Dec. 24, 2020

Related U.S. Application Data

(60) Provisional application No. 62/863,031, filed on Jun. 18, 2019.

(51) Int. Cl.
*G06F 21/62* (2013.01)
*G06N 3/02* (2006.01)

(52) U.S. Cl.
CPC ........... *G06F 21/6218* (2013.01); *G06N 3/02* (2013.01)

(58) Field of Classification Search
CPC .............................. G06N 3/02; G06F 21/6218
See application file for complete search history.

(56) References Cited

U.S. PATENT DOCUMENTS

| 9,620,108 | B2 | 4/2017 | Sak et al. | |
|---|---|---|---|---|
| 2015/0309992 | A1* | 10/2015 | Visel | G06F 40/30 704/9 |
| 2018/0336183 | A1* | 11/2018 | Lee | G06N 3/08 |
| 2019/0012591 | A1* | 1/2019 | Limsopatham | G06N 3/0445 |

OTHER PUBLICATIONS

Quora, "What is max pooling in convolutional neural networks?" https://www.quora.com/What-is-max-pooling-in-convolutional-neural-networks, 6 pages, [retrieved from Internet: Aug. 2, 2021].

* cited by examiner

*Primary Examiner* — Elton Williams
(74) *Attorney, Agent, or Firm* — Morgan, Lewis & Bockius LLP (57) ABSTRACT

An example method comprises: receiving a natural language text; transforming, by a neural network, the natural language text into a numeric representation comprising a plurality of numeric values; discarding the natural language text; and performing, using the numeric representation of the natural language text, an information extraction task.

20 Claims, 5 Drawing Sheets

UTILIZING NEURAL NETWORKS FOR DATA ANONYMIZATION

REFERENCE TO RELATED APPLICATION

This application claims the benefit of U.S. Provisional Patent Application No. 62/863,031, filed Jun. 18, 2019, the entirety of which is incorporated herein by reference.

TECHNICAL FIELD

The present disclosure is generally related to computer systems, and is more specifically related to systems and methods of data anonymization.

BACKGROUND

Various methods of information extraction and analysis may be applied to natural language texts. Examples of such methods include named entities recognition (NER), fact extraction, etc.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Various methods of textual information extraction and analysis may be applied to natural language texts. Notably, the original texts may contain sensitive information, including personal data (i.e., any information that relates to an identified or identifiable living individual), trade secrets, etc. Therefore, systems that process and store the original texts are inherently at risk of leaking this sensitive information.

The systems and methods of the present disclosure alleviate the above-referenced and other deficiencies of various common methods by converting a natural language text that potentially contains sensitive information into a representation that renders restoring the full original text impossible or at least impracticable (in particular, renders impossible restoring references to various entities that may be contained in the original text, such as names, locations, account numbers, addresses, etc., and other information that may identify persons, things, places, or entities), while preserving certain aspects of the content, for example, the semantic content and emotional coloring.

In accordance with one or more aspects of the present disclosure, the original text may be processed by a neural network (e.g., implementing the encoder part of an autoencoder). "Autoencoder" herein shall refer to a neural network that includes two parts: encoder, which transforms the input signal (e.g., a natural language text) into a compressed form (e.g., a vector of integers), and a decoder, which restores the original input signal from its compressed representation.

The input natural language text may be fed to a neural network implementing the encoder, which would produce a numeric representation of the original text. Various methods of information extraction and analysis may then be applied to the numeric representation of the original text in order to perform the desired information extraction tasks. Examples of tasks that may be performed using the numeric vector representations of natural language texts, in accordance with one or more aspects of the present disclosure, include processing various forms of recorded communications (including electronic mail messages, instant messages, voice mail message transcripts, etc.) in order to, for example, evaluate the efficiency of corporate communications, evaluate performance of teams and individuals, predict likely events (e.g., resignation of an employee), detect inappropriate behavior (e.g., sexual harassment) by an individual, and/or detect various intra-organizational or interpersonal conflicts or other issues.

The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in detail herein below by way of examples, rather than by way of limitation.

Figure 1:
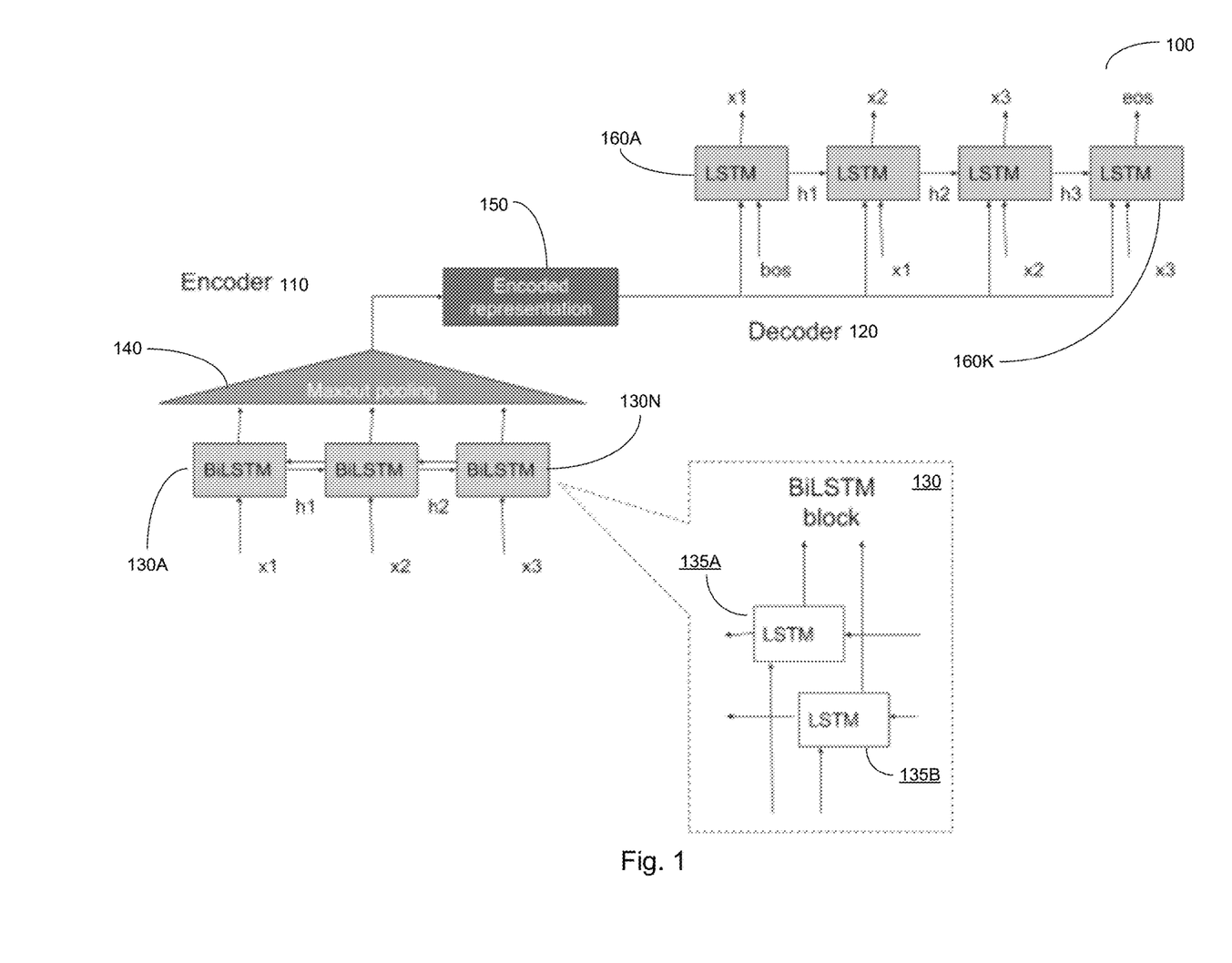
FIG. 1 schematically illustrates an example high-level architecture of a neural network that may be employed for producing a transformed representation of an input natural language text, in accordance with one or more aspects of the present disclosure.

FIG. 1 schematically illustrates an example high-level architecture of a neural network 100 that may be employed for producing a transformed representation of an input natural language text, in accordance with one or more aspects of the present disclosure.

A neural network is a computational model that applies to its input (e.g., a natural language) a set of transformations performed by multiple interconnected artificial neurons in order to produce an output (e.g., a numeric vector representing a natural language text). Conceptually, a neural network may be viewed as a network of nodes represented by artificial neurons, each of which may change its internal state according to an input and the node-specific activation function, and produces an output depending on the input and the node internal state. The artificial neural neurons are interconnected to form a directed weighted graph. The weights and the activation function parameters may be adjusted by a supervised or unsupervised training process, as described in more detail herein below.

As noted herein above, the neural network 100 utilized by the systems and methods of the present disclosure may include two functional components: encoder 110, which transforms the input natural language text or its intermediate representation (e.g., the term frequency/inverse document frequency TF-IDF representation) into an encoded representation (e.g., a numeric vector), and a decoder 120, which restores the original natural language text from its encoded representation.

The encoder 110 implements the following function:

$$E: X \to z,$$

where X is the input signal (e.g., the input natural language text) and z is the compressed representation of the input signal (e.g., a numeric vector).

The decoder implements the following function:

$$D: z \to X',$$

where X' is the restored input signal approximating the input signal X.

The particular form and implementation of the encoder and decoder functions may depend on the particular task being solved.

As shown in FIG. 1, the encoder 110 includes one or more layers of bidirectional Long-Short Term Memory (BiLSTM) blocks 130A-130N. Each BiLSTM block 130 includes a pair of Long-Short Term Memory (LSTM) blocks 135A-135B, such that one LSTM block 135A reads the input natural language text in the forward direction, while the other LSTM block 135B reads the input natural language text in the backward direction. The output of the last layer of BiLSTM blocks 130 is fed to the MaxPooling block 140 which summarizes its inputs to produce a single numeric vector of a fixed size, which is independent of the input signal size. This numeric vector provides the encoded (e.g., compressed) representation 150 of the input natural language text. In turn, the decoder 120 receives the compressed representation 150 and the result of the previous decoding iteration and recurrently restores the input natural language text. In the illustrative example of FIG. 1, the decoder 120 includes one or more layers of LSTM) blocks 160A-160K.

The neural network 100 implementing the autoencoder may be trained to minimize the difference between the input signal and the output signal, e.g., as follows:

$$E, D = \mathrm{argmin}_{E,D} \|X - X'\|$$

where argmin denotes the argument of the minimum, i.e., the functions D, E which minimize the value of the difference between the input signal and the output signal, and ∥ ∥ denotes the norm of its argument, such as p-norm (e.g., the Euclidean norm).

Thus, unsupervised training of the autoencoder may involve iteratively processing a training corpus of natural language texts. For each natural language text of the corpus, the values of z (the encoded representation of the natural language text) and X' (the restored original natural language text) may be computed, and the difference between those values ∥X−X'∥ may be determined. The parameters of the encoder E and/or decoder D (e.g., the weights and the activation function parameters of the respective encoding or decoding part of the neural network) may be adjusted based on the computed difference after each iteration in order to minimize the value of ∥X−X'∥, and at least some texts of the corpus may be processed again in order to determine the new values of z (the encoded representation of the natural language text), X' (the restored original natural language text), and their difference ∥X−X'∥. After each iteration, a terminating condition may be evaluated, and the iterations may either continue or terminate. The terminating condition may, for example, be based on the difference ∥X−X'∥ between the input signal X and its restored form X' falling below a predetermined threshold value and/or the number of iterations exceeding a predetermined threshold number.

Accordingly, the trained encoder 110 would encode, into the encoded representation 150, various semantic and linguistic features of the input natural language text. The resulting encoded representation 150 allows for certain natural language tasks be solved by performing mathematical transformations on the encoded representation 150.

In an illustrative example, numeric vectors produced by the encoder that represent semantically similar texts are strongly correlated, such that the angle between those vectors is relatively small (i.e., below a low threshold value). Conversely, vectors of semantically different texts would exhibit weak or no correlation, such that the angle between those vectors is relatively large (i.e., above a high threshold value). This feature in itself allows utilizing the numeric vector representations of natural language texts for semantic-based processing of natural language texts.

Since various natural language processing methods may be performed on the numeric vector representation of the natural language texts, the decoder may be discarded after completing the autoencoder training, thus impeding the restoration of the input natural language text. Furthermore, the output vector of the encoder may be further distorted by an irreversible transformation (i.e., a one-way function) that preserves the structure of the original vector. A function is one-way if its value may be computed by a polynomial time algorithm, but any polynomial time randomized algorithm that attempts to compute an inverse for that function (i.e., restore its argument based on a given value) succeeds with negligible probability. In order to preserve the structure of the original vector, a homomorphic transformation may be chosen (i.e., a transformation that specifies a mapping between two algebraic structures of the same type, such as groups, rings, or vector spaces).

Thus, applying the distorting transformation to the output vector of the encoder would further thwart any efforts directed to restoring the original text. Furthermore, applying the distorting transformation to the output vector of the encoder may lead to losing some information encoded by the numeric vector representations of the natural language texts. Thus, not only the text restoration from the transformed numeric representation would become impossible, but also it would be impossible to prove that a given numeric representation is derived from a particular text.

The distorting transformation constructed in accordance with aspects of the present disclosure preserves semantic and other features extracted from the natural language texts. Thus, the transformed numeric vector representations of natural language texts may be stored and processed instead of storing and processing the input natural language texts themselves. Furthermore, the transformed numeric vector representations of natural language texts may be utilized for solving certain tasks that were not contemplated at the time of training the autoencoder.

In an illustrative example, using a labeled text corpus, in which natural language texts are labeled to reflect their classification to a predetermined set of classification categories, such as Sport, Weather, Science, Conflict, etc., a model may be trained to infer the text classification from the numeric vector representation of the input text.

Figure 2:
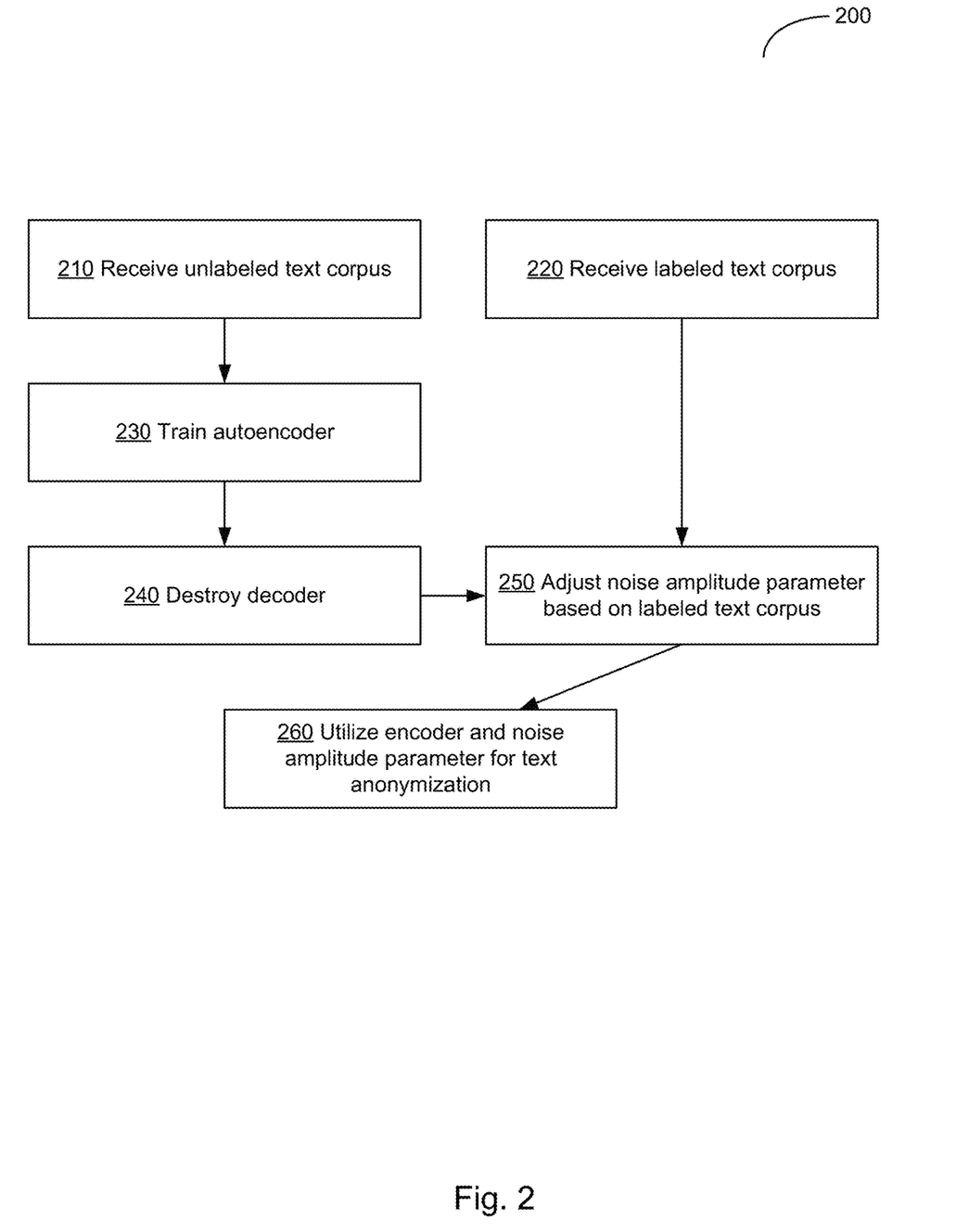
FIG. 2 depicts a flowchart of an example method of constructing an encoder to be utilized for deriving numeric vector representations of natural language texts, in accordance with one or more aspects of the present disclosure.

FIG. 2 depicts a flowchart of an example method of constructing an encoder to be utilized for deriving numeric vector representations of natural language texts, in accordance with one or more aspects of the present disclosure. Method 200 and/or each of its individual functions, routines, subroutines, or operations may be performed by one or more processors of the computer system (e.g., the example computer system 1000 of FIG. 5) implementing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other.

At blocks 210-220, the computer system implementing the method receives an unlabeled text corpus to be utilized for unsupervised training of the autoencoder and a labeled text corpus to be utilized for determining a value of a noise amplitude parameter of the distorting transformation. In certain implementations, the texts of the two corpora may be semantically similar to the texts to be processed by the trained models.

At block 230, the autoencoder is trained using the unlabeled text corpus, as described in more detail herein above.

At block 240, the decoder part of the autoencoder is discarded.

At block 250, the computer system determines the value of the noise amplitude parameter for distorting the output vector of the decoder part of the autoencoder. Determining the value of the noise amplitude parameter may involve identifying the maximum value of the noise amplitude parameter which, when applied to perform the distorting transformation of one or more texts of the labeled text corpus, produces distorted representations of those texts, such that the distorted representations are suitable for performing the desired natural language processing tasks. In an illustrative example, various optimization methods may be employed for determining the value of the noise amplitude parameter, e.g., the bisection method that involves iteratively bisecting the interval in which the function being optimized changes its sign (in the instant case, the function changing its sign is equivalent to the produced distorting transformation becoming unsuitable for performing the desired natural language processing tasks) and then selecting the subinterval in which the function changes sign.

At block 260, the encoder and the noise amplitude parameter are utilized for performing various natural language processing tasks.

Figure 3:
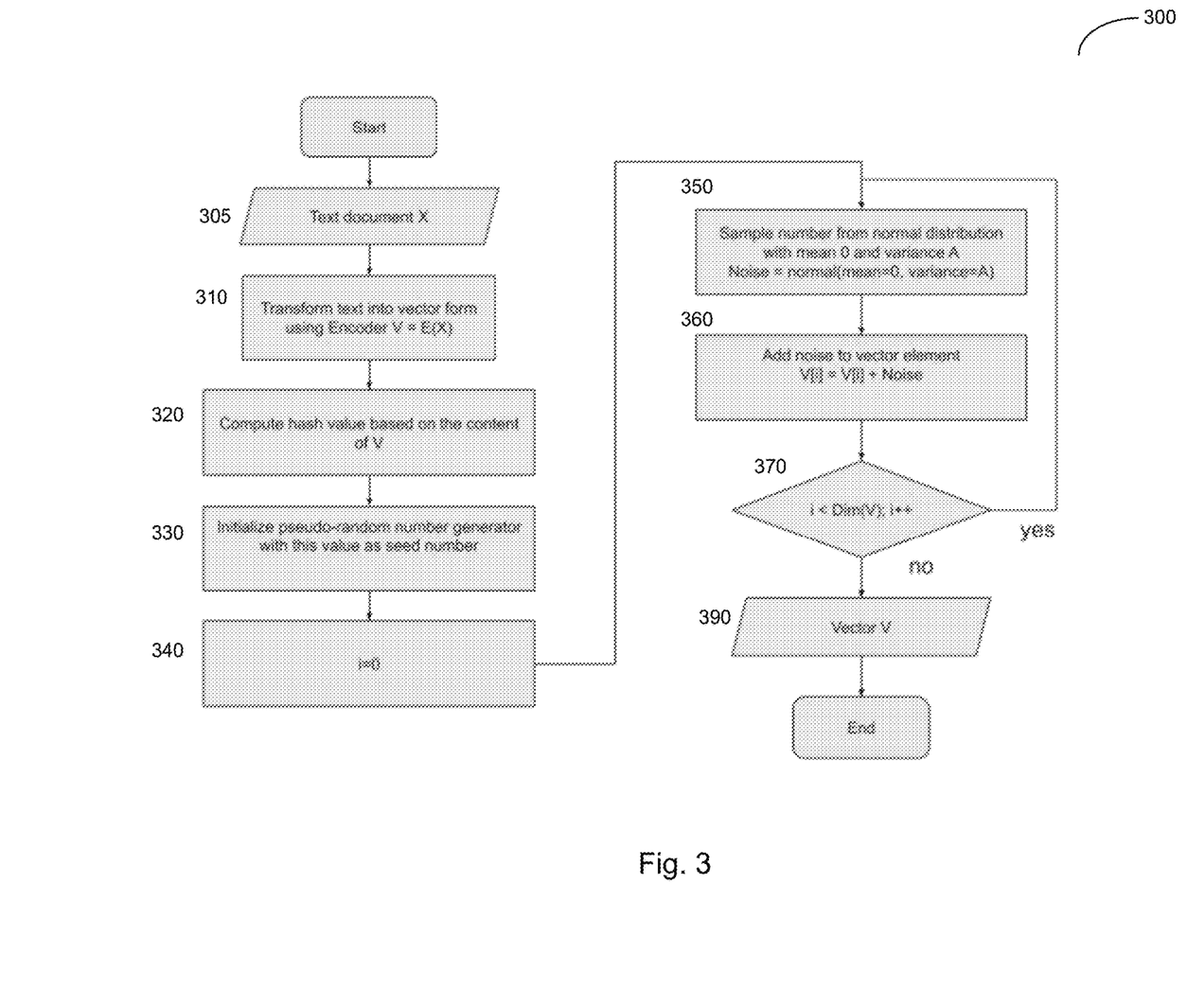
FIG. 3 depicts a flowchart of an example method of transforming a natural language text into a numeric vector representation, in accordance with one or more aspects of the present disclosure.

FIG. 3 depicts a flowchart of an example method 300 of transforming a natural language text into a numeric vector representation, in accordance with one or more aspects of the present disclosure. Method 300 and/or each of its individual functions, routines, subroutines, or operations may be performed by one or more processors of the computer system (e.g., the example computer system 1000 of FIG. 5) implementing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, the computer system implementing the method utilizes an encoder to transform an input natural language text X (305) into a numeric vector representation:

$$V=E(X),$$

where X denotes the input natural language text,
E denotes the transformation performed by the encoder, and
V denotes the numeric representation produced by the encoder.

At block 320, the computer system applies a hash function to compute a hash value of the numeric text representation. The hash function may be any suitable function that maps the numeric input of arbitrary size to a fixed-size numeric output.

At block 330, the computer system initializes a pseudo-random number sequence utilizing the computed hash value as the seed value.

At blocks 340-370, the computer system iterates through the components of the numeric vector representation V of the input natural language text. For each component of the vector, the computer system may sample, using the pseudorandom number sequence, a specified statistical distribution (e.g., a normal distribution having the mean of zero and the standard deviation of the noise amplitude parameter A, which can be determined as described in more detail herein above). The current component of the vector is then modified by adding the sampled value.

The resulting vector V (390) is the numeric representation of the input natural language text. Upon completing the operations of method 300, the source text may be discarded.

Figure 4:
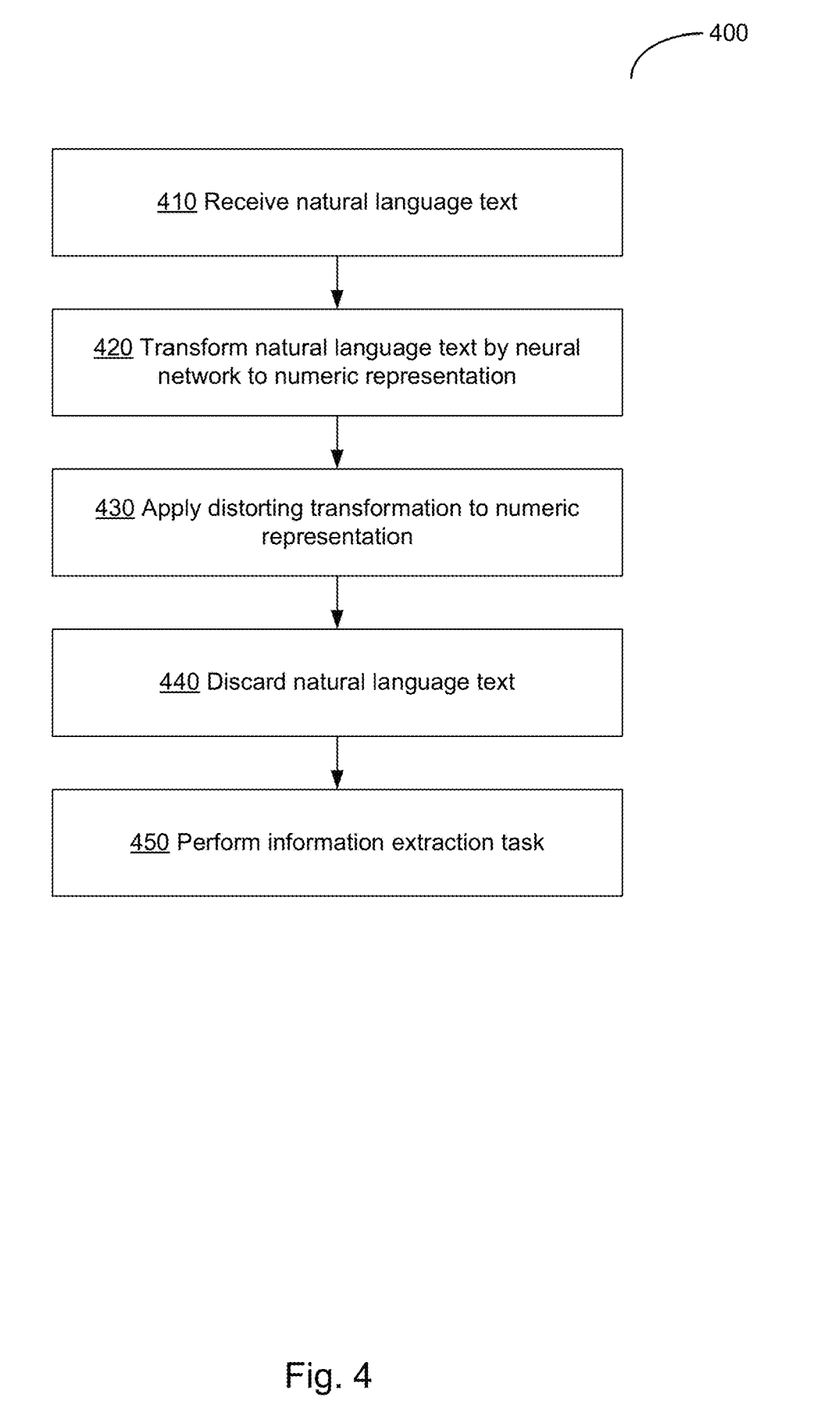
FIG. 4 depicts a flowchart of an example method of performing information extraction tasks using anonymized representations of natural language texts, in accordance with one or more aspects of the present disclosure.

FIG. 4 depicts a flowchart of an example method 400 of performing information extraction tasks using anonymized representations of natural language texts, in accordance with one or more aspects of the present disclosure. Method 400 and/or each of its individual functions, routines, subroutines, or operations may be performed by one or more processors of the computer system (e.g., the example computer system 1000 of FIG. 5) implementing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, the computer system implementing the method receives a natural language text.

At block 420, the computer system transforms, by a neural network, the natural language text into a numeric representation (e.g., a numeric vector), as described in more detail herein above.

At block 430, the computer system applies, to the numeric representation of the natural language text, an irreversible transformation, as described in more detail herein above.

At block 440, the computer system discards the natural language text.

At block 450, the computer system performs, using the transformed numeric representation of the natural language text, one or more information extraction tasks. In an illustrative example, the transformed numeric representation of the natural language text is fed to a neural network that is pre-trained for performing the desired natural language processing task, such as an information extraction task, a text classification task, etc.

In some implementations, the natural language texts processed by the systems and methods of the present disclosure may include various forms of recorded communications (including electronic mail messages, instant messages, voice mail message transcripts, etc.).

In some implementations, a trained neural network may process a set of natural language texts in order to evaluate a process characterized by natural language texts. In an illustrative example, the neural network may produce one or more numeric values indicative of the quality of a workflow (by analyzing tasks, status reports, queries, innovation proposals). In another illustrative example, the neural network may produce one or more numeric values indicative of the outcome of the employee's onboarding process. In another illustrative example, the neural network may produce one or more numeric values indicative of the efficiency of corporate communications, etc.

In some implementations, a trained neural network may process a set of natural language texts in order to evaluate the likelihood of occurrence of a specified event or condition. In an illustrative example, the neural network may produce one or more numeric values indicative of the likelihood of resignation of an employee. In an illustrative example, the neural network may produce one or more numeric values indicative of the likelihood of risks of sensitive information leakage.

In some implementations, a trained neural network may process a set of natural language texts in order to evaluate one or more specified emotional aspects of the natural language text. In an illustrative example, the neural network may produce one or more numeric values indicative of the emotional state of employees and/or emotional context of an organization. In another illustrative example, the neural network may produce one or more numeric values indicative of the certain aspects of relationships of employees with their peers and managers (e.g., identifying praise, approval, congratulations, emotional pressure, etc.). In another illustrative example, the neural network may produce one or more numeric values indicative of positive and/or negative aspects of client feedback with respect to a product or service. In another illustrative example, the neural network may produce one or more numeric values indicative of motivation and involvement of employees in certain processes, workflows, etc. In another illustrative example, the neural network may produce one or more numeric values indicative of certain cultural features of the analyzed communications.

In some implementations, a trained neural network may process a set of natural language texts in order to identify certain conditions, situations, and/or issues. In an illustrative example, the neural network may produce one or more numeric values indicative of the likelihood of occurrence of an intra-organizational conflict. In another illustrative example, the neural network may produce one or more numeric values indicative of the likelihood of occurrence of a conflict of organization members with third parties (suppliers, clients, business partners, etc.). In another illustrative example, the neural network may produce one or more numeric values indicative of the likelihood of occurrence of an instance of sexual harassment by one party of the analyzed corporate communications with respect to another party of the analyzed corporate communications.

The neural network for processing the transformed numeric representations of the input natural language text may be trained on a labeled corpus of text and/or a labeled set of transformed numeric representations. The labels may indicate the known numeric values (to be interpreted in the context of the particular task, as explained above) associated with the respective transformed representations. Training the neural network may involve iteratively processing one or more labeled transformed numeric representations of the natural language texts, comparing the results produced by the neural network with the known numeric values specified by the respective labels, and adjusting the parameters of the neural network in order to minimize the difference between the results produced by the neural network with the known numeric values specified by the respective labels.

Numeric vector representations of natural language texts produced in accordance with one or more aspects of the present disclosure may be also utilized for performing various other natural language processing tasks, such as text classification, automatically structuring information based on its semantic content, etc.

Figure 5:
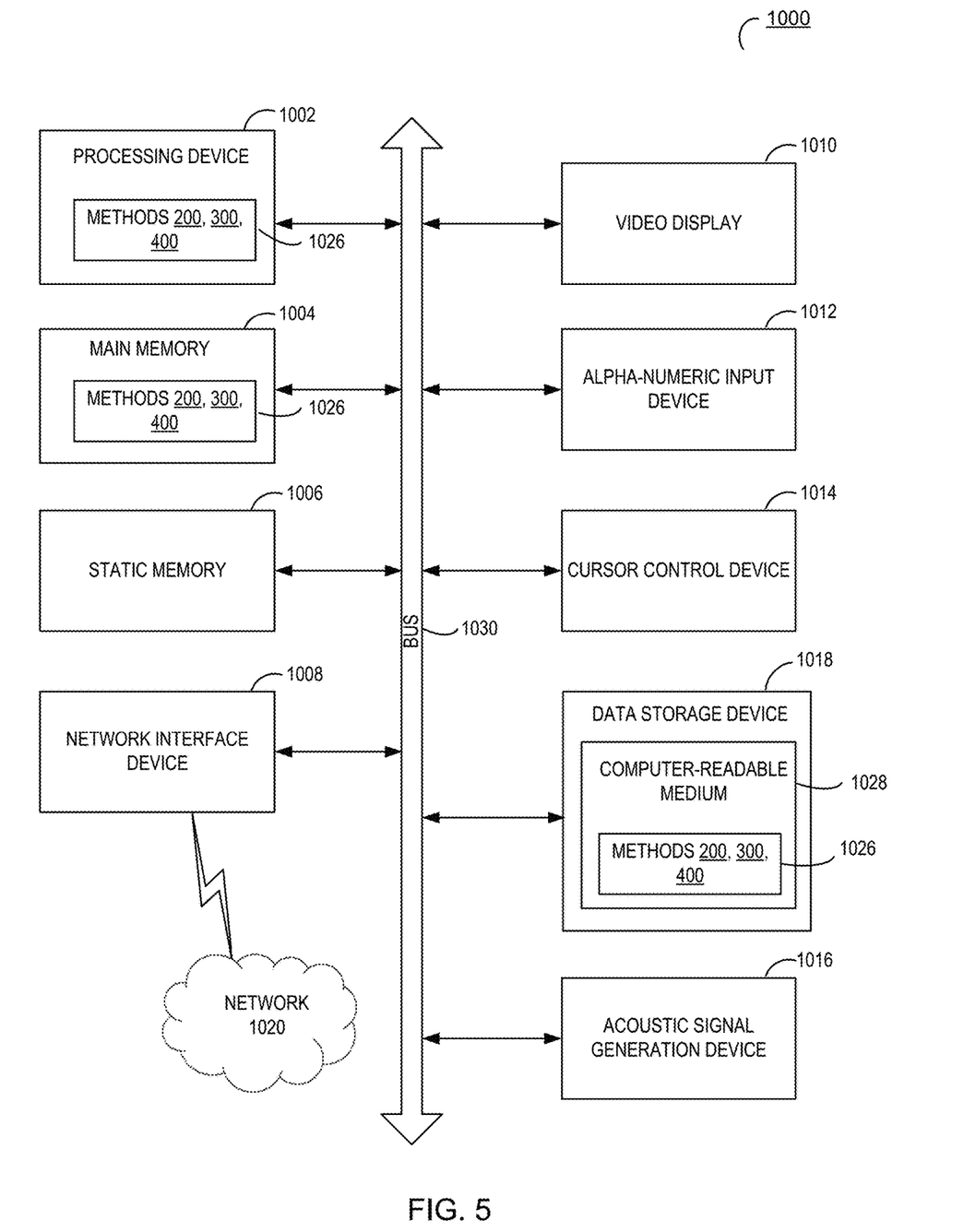
FIG. 5 schematically illustrates a component diagram of an example computer system which may perform the methods described herein.

FIG. 5 schematically illustrates a component diagram of an example computer system 1000 which may perform the methods described herein. Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions implementing the methods described herein.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of the methods described herein, including method 200 of constructing an encoder to be utilized for deriving numeric vector representations of natural language texts, method 300 of transforming a natural language text into a numeric vector representation, and/or method 400 of performing information extraction tasks using anonymized representations of natural language texts.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 5 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
receiving, by a computer system, a natural language text;
producing, by a neural network, a numeric representation of the natural language text, wherein producing the numeric representation of the natural language text further comprises applying an irreversible distorting transformation to the numeric representation of the natural language text;
discarding the natural language text; and
performing, using the numeric representation of the natural language text, an information extraction task.

2. The method of claim 1, wherein the neural network is an encoder part of an autoencoder.

3. The method of claim 1, wherein applying to the numeric representation of the natural language text the irreversible distorting transformation further comprises:
adding, to each element of the numeric representation, a sample of a specified statistical distribution.

4. The method of claim 1, wherein performing the information extraction task comprises:
using the numeric representation of the natural language text to determine that associating the natural language text was associated with a category of a predefined set of categories.

5. The method of claim 1, wherein performing the information extraction task comprises:

evaluating a process that was characterized by the natural language text.

6. The method of claim 1, wherein performing the information extraction task comprises:
evaluating a likelihood of occurrence of a specified event or condition.

7. The method of claim 1, wherein performing the information extraction task comprises:
evaluating an emotional aspect that was present in the natural language text.

8. The method of claim 1, wherein performing the information extraction task comprises:
feeding the numeric representation of the natural language text to a neural network that produces a numeric value indicative of a characteristic that was present in the natural language text.

9. A system, comprising:
a memory; and
a processor coupled to the memory, the processor configured to:
receive a natural language text;
transform, by a neural network, the natural language text into a numeric representation;
apply an irreversible distorting transformation to the numeric representation of the natural language text;
discard the natural language text; and
perform, using the numeric representation of the natural language text, an information extraction task.

10. The system of claim 9, wherein the neural network is an encoder part of an autoencoder.

11. The system of claim 9, wherein the processor being configured to perform the information extraction task comprises the processor being configured to:
use the numeric representation of the natural language text to determine that the natural language text was associated with a category of a predefined set of categories.

12. The system of claim 9, wherein the processor being configured to perform the information extraction task comprises the processor being configured to:
evaluate a process that was characterized by the natural language text.

13. The system of claim 9, wherein the processor being configured to perform the information extraction task comprises the processor being configured to:
evaluate a likelihood of occurrence of a specified event or condition.

14. The system of claim 9, wherein the processor being configured to perform the information extraction task comprises the processor being configured to:
evaluate an emotional aspect that was present in the natural language text.

15. A non-transitory computer-readable storage medium comprising executable instructions that, when executed by a computer system, cause the computer system to:
receive a natural language text;
transform, by a neural network, the natural language text into a numeric representation;
apply an irreversible distorting transformation to the numeric representation of the natural language text;
discard the natural language text; and
perform, using the numeric representation of the natural language text, an information extraction task.

16. The non-transitory computer-readable storage medium of claim 15, wherein the neural network is an encoder part of an autoencoder.

17. The non-transitory computer-readable storage medium of claim 15, wherein the executable instructions that cause the computer system to perform the information extraction task further comprise executable instructions that, when executed by the computer system, cause the computer system to:
feed the numeric representation of the natural language text to a neural network that produces a numeric value indicative of a characteristic that was present in the natural language text.

18. The non-transitory computer-readable storage medium of claim 15, wherein:
the neural network was trained, in part, using a decoder that was configured to decode respective training numeric representations into natural language text from a corpus of training text, and
the decoder is discarded after completing training of the neural network and prior to the computer system being caused to transform the natural language text into the numeric representation.

19. The non-transitory computer-readable storage medium of claim 15, wherein the irreversible distorting transformation that is applied to the numeric representation is configured to thwart efforts directed to restoring the natural language text based on the numeric representation while preserving, in the numeric representation, semantic and other features extracted from the natural language text.

20. The system of claim 9, wherein:
the neural network was trained, in part, using a decoder that was configured to decode respective training numeric representations into natural language text from a corpus of training text, and
the decoder is discarded after completing training of the neural network and prior to the transforming of the natural language text into the numeric representation.

* * * * *

UNITED STATES PATENT AND TRADEMARK OFFICE
CERTIFICATE OF CORRECTION

| | |
|---|---|
| PATENT NO. | : 11,574,069 B2 |
| APPLICATION NO. | : 16/902937 |
| DATED | : February 7, 2023 |
| INVENTOR(S) | : Yan et al. |

It is certified that error appears in the above-identified patent and that said Letters Patent is hereby corrected as shown below:

In the Claims

Claim 4, Column 10, Line 62, please delete "that associating the" and insert --that the--.

Signed and Sealed this
Fourth Day of July, 2023

*Katherine Kelly Vidal*

Katherine Kelly Vidal
*Director of the United States Patent and Trademark Office*